United States Patent [19]

Witek

[11] Patent Number: 4,780,219

[45] Date of Patent: Oct. 25, 1988

[54] SYSTEM FOR FILTERING SUSPENDED SOLIDS FROM A LIQUID

[76] Inventor: Joseph F. Witek, 407 Delles, Wheaton, Ill. 60187

[21] Appl. No.: 70,066

[22] Filed: Jul. 6, 1987

[51] Int. Cl.⁴ .................. B01D 23/10; B01D 37/00
[52] U.S. Cl. .................... 210/786; 210/792; 210/795; 210/269; 210/274; 210/277
[58] Field of Search ............ 210/792–796, 210/807, 269, 274–280, 786, 788, 512.1, 269

[56] References Cited

U.S. PATENT DOCUMENTS

| | | | |
|---|---|---|---|
| 3,424,674 | 1/1969 | Webber | 210/189 |
| 3,471,025 | 10/1969 | Dobson | 210/290 |
| 3,698,554 | 10/1972 | Mail | 210/274 |
| 4,162,216 | 7/1979 | Nyer | 210/794 |
| 4,328,105 | 5/1982 | Arbuckle | 210/807 |

*Primary Examiner*—Ivars Cintins
*Attorney, Agent, or Firm*—Robert E. Knechtel; Basil E. Demeur; Alan B. Samlan

[57] ABSTRACT

A filtration system and method for the removal of suspended solids from a contaminated liquid in which the contaminated liquid is pumped into the top of a vessel and allowed to flow through a bed of polyethylene particles which acts as a filtering medium. Periodically the flow of liquid through the polyethylene filter bed is stopped and a backwash cycle in which the contaminated liquid is pumped in a reverse flow direction through the filter bed is initiated. By thoroughly agitating the filter bed and polyethylene particles, contaminants are loosened and removed from the polyethylene particles and placed back into the liquid. The highly concentrated contaminated liquid is removed from the vessel for further processing. The filter bed is reset and the filtering cycle is again initiated.

23 Claims, 7 Drawing Sheets

SYSTEM FOR FILTERING SUSPENDED SOLIDS FROM A LIQUID

BACKGROUND OF THE INVENTION

This invention relates to a method and system for the removal of solids from a liquid containing suspended solids by flowing the liquid through a filter bed of polyethylene particles and periodically cleaning the polyethylene particles.

Filtration has long been a major method of removing suspended solids from liquid streams. Due to governmental regulations and controls, and in an effort to maintain the purity of the streams and rivers, waste water treatment is often necessary before the waste water can be discharged from industrial applications. Suspended solids must be removed. In the past the most widely used filters have been sand filters or mixed media filters. However, sand and mixed media filters are generally effective in removing solids only to a limited extent. The reason is that these sand and mixed media filters generally will clog in situations in which the solids are highly concentrated. Furthermore, when the filter bed begins to clog, there is an extremely high pressure drop across the filter bed.

Some filtering systems have used a filter bag, cartridge, or filter aid, all of which require filter media replacement. The obvious disadvantage of these type of systems is that when the filter becomes clogged or used up, an operator must attend to the removal and replacement of the filter media. Furthermore, attempts to provide a backwash to cleanse heavier than liquid filters in these systems generally proved to be inefficient.

One application which utilizes polyethylene beads that are floated in the fluid is disclosed in U.S. Pat. No. 3,424,674. This patent discloses a polyethylene filter bed in which the filter material is constantly circulated, cleaned and then returned to the filter bed. The problem with this invention is that it requires a fairly complex mechanism to remove the polyethylene particles from the filter bed for cleaning and then provide a means for returning the cleaned particles back to the bed. In another embodiment, a separate paddle mechanism is used to agitate the filter bed in order to provide the flow of filter particles through the cleaning means. The '674 patent teaches away from the backwashing technique to clean the filter bed. The reasons given are that backwashing requires substantial volumes of clean fluid, that the entire filter bed is disrupted and filtration must be suspended during the backwash interval until the filter material once again has resettled into a filter bed.

Another patent directed to a filtration system is U.S. Pat. No. 4,162,216. This disclosure illustrates the use of a discontinuous polyurethane particle filter bed. The liquid containing suspended solids is flowed through the filter bed which traps the solids. A regeneration liqid is added to the filter vessel and the filter bed is mechanically mixed. The liquid is discharged from the vessel for further cleaning. The problem with the use of polyurethane particles is that they sink to the bottom of the vessel and do not provide adequate filtering means. Furthermore, they cannot easily be cleaned by the mechanical mixing as described in the '216 patent. The shortcomings are made more apparent by the fact that the inventor states that it may be necessary to add a coagulant material in order to enhance the efficiency of the filter bed. Another problem with using polyurethane foam as a filtering material, is that during backwashing a high flow velocity through the filter bed is required to wash the solids from the polyurethane foam. This often causes particles of the polyurethane foam out of the filter bed or otherwise damages the filter bed. This further highlights the problem of utilizing polyurethane foam as a filtering material.

Accordingly, is it an object of the present invention to provide an improved method and system for removing suspended solids from liquids. Related to this object is the object of providing a bed of polyethylene particles which serves as a floating filter media.

Another object is to provide a system that backwashes the accumulated solids from the filter bed by the use of non-filtered liquid and collects the accumulated solids into a storage tank where they can be further processed and removed. An advantage of the inventive system is that the backwashing is accomplished with on-stream liquid and therefore does not introduce fresh or filtered fluid into the system.

Yet another object is to provide a filtering system which provides for backwashing solids from the filter bed without the use of mechanical paddles in the filtering vessel.

Still another object is to provide a filtering system which does not require periodic replacement of the filtering media, nor require filter bags, cartridges, or other disposable components.

Another object is to provide a filtering system that can be made of food grade components and resistant to most chemicals.

Other objects and advantages of the present invention will be apparent from the detailed description of the preferred embodiment and appended claims.

SUMMARY OF THE INVENTION

Applicant's invention provides a system and method for the removal of solids from a liquid containing suspended solids. A filtration vessel is provided with a filter bed of ground polyethylene particles which freely float within the vessel. A pump feeds the contaminated liquid into the vessel under pressure. The contaminated liquid flows through the polyethylene filter bed and out through an outlet positioned towards the top of the vessel. A screen located at the top of the filter bed restricts the upper movement of the polyethylene but allows the liquid to pass through. This creates a dense mass of polyethylene particles which are suitable for fine particle retention through adsorption of solids within the porous structure.

Periodically, a controller automatically reverses the flow of liquid and backwashes the accumulated solids back into a storage tank. Backwashing is accomplished with on-stream liquid and therefore does not introduce purified or filtered liquid into the system. During backwashing the filter bed is thoroughly agitated by the flow of the liquid in the vessel, which is enhanced by mixing and spray pumps, so that the contaminants are loosened and removed from the polyethylene particles. The filter bed is then reset and the filtering process resumed.

DETAILED DESCRIPTION OF THE PREFERRED EMBODIMENT

Figure 1:
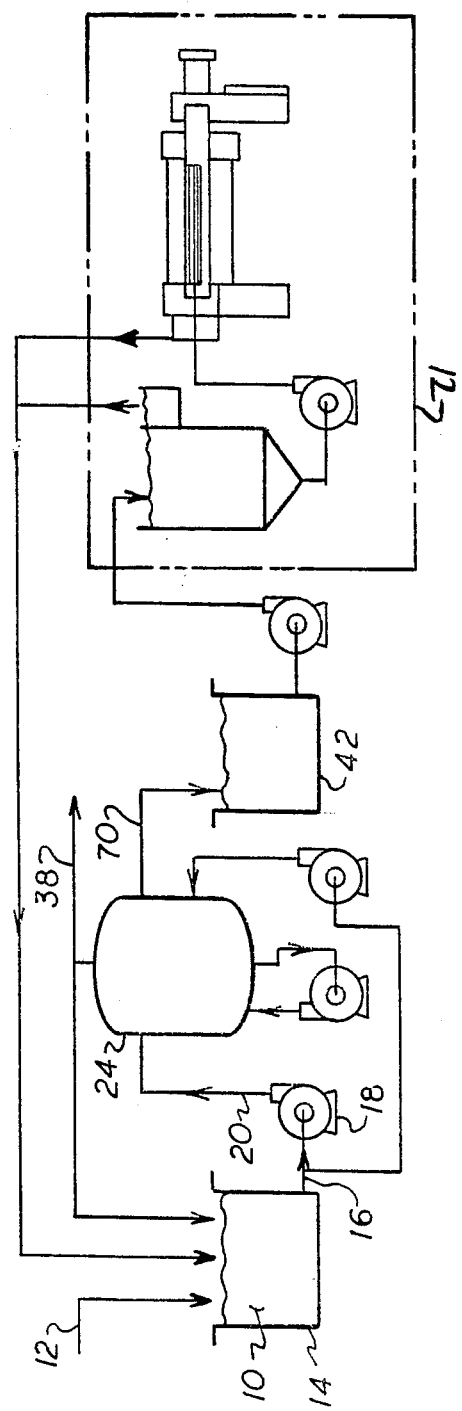
FIG. 1 is a schematic diagram of the filtering system of the present invention.
Figure 2:
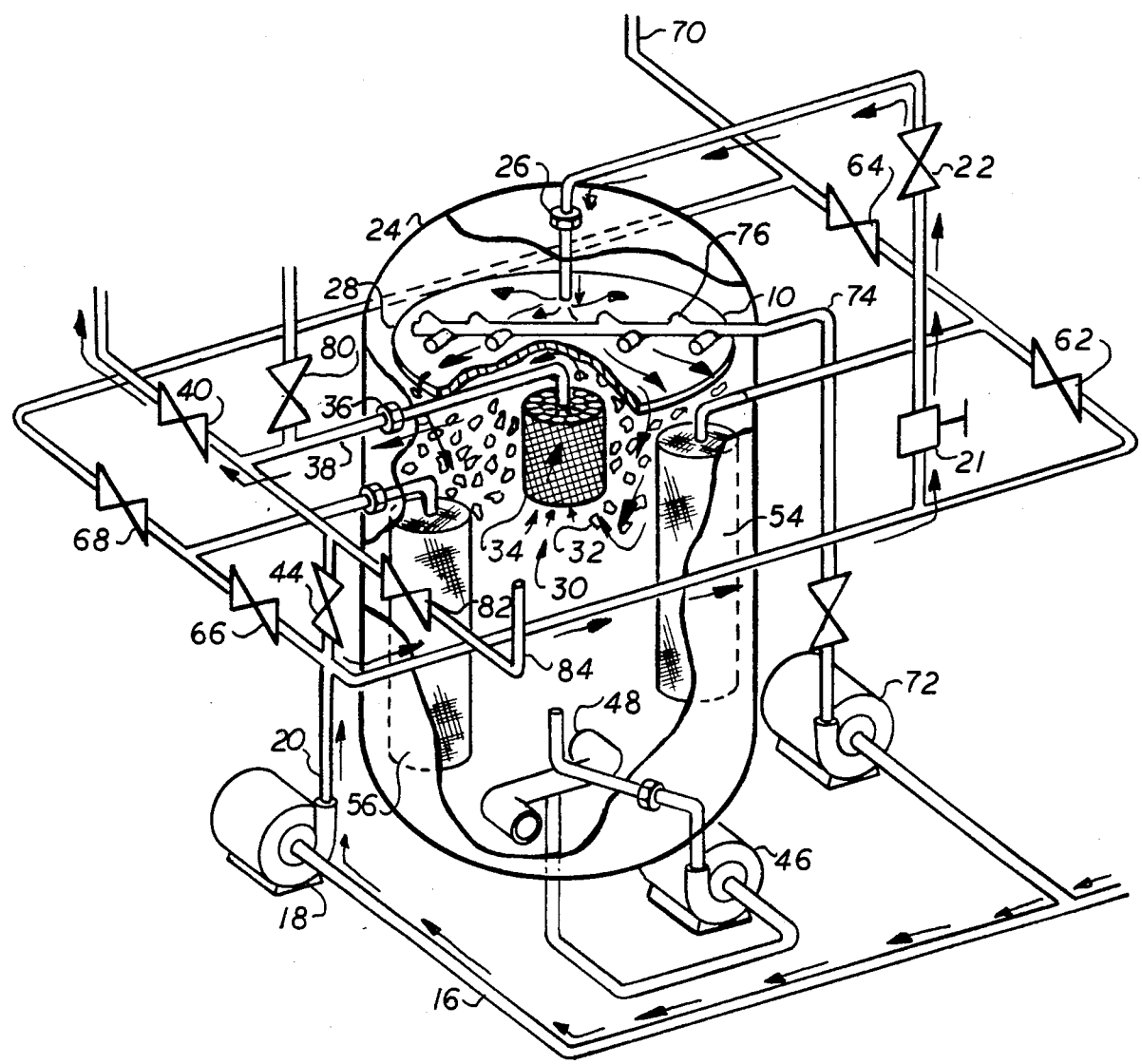
FIG. 2 is a schematic view of the filtering system when in the filtration mode.

Referring now to FIGS. 1 and 2, the filtration system will be described. Contaminated liquid or feedwater 10 is transported from an initial pre-treatment which has pre-treated the waste water by pH adjustment. The feedwater 10 enters a feedwater inlet line 12 which discharges into a feedwater collection tank 14. A contaminated feedwater line 16 connects the output of the feedwater collection tank 14 to a pump 18. The output of the pump 18 is connected to a line 20 having a throttling valve 21 which maintains the contaminated water flow at approximately 1.3 times the rate of feedwater entering through inlet line 12. The outlet of valve 21 is connected to the inlet of an open/close control valve 22.

With the valve in the open position, the contaminated liquid or feedwater is allowed to flow into a vertically mounted cylindrical filtration vessel 24 through inlet 26. The feedwater is discharged onto a circular deflector plate 28 at the top of the vessel 24. The deflector plate 28 extends outward towards the vessel's walls but terminates just before touching the walls. Thus, the contaminated liquid 10 cascades over the top of the plate 28 and is discharged into the body of the vessel 24 near the vessel's walls. The feedwater flows over the plate 28 at an angle which imparts a rotational motion to the water as it progresses towards the periphery of the vessel and downward into the vessel.

A filter bed 30 of polyethylene particles 32, which freely floats in the water, follows the flow of contaminated liquid 10 retained in the vessel 24. A discharge collector screen 34 is mounted just below the deflector plate 28. A discharge pipe 38 passes through an outlet 36 providing an outlet for filtered liquid discharge from vessel 24. The screen 34 keeps the polyethylene particles from being discharged through the discharge pipe 38 with the filtered liquid. This creates a dense filter mass of polyethylene particles 32 which is suitable for fine particle retention.

As the contaminated liquid 10 passes through the filter bed 30, the solids are collected on the particles 32 in the filter bed 30. The polyethylene particles 32 are non-uniform in size which provides for large void areas between particles. The size of the ground polyethylene particles are between 10 and 50 mesh. This results in approximately a 40% void area in the filter bed 30.

The pump 18 pumps the contaminated liquid 10 through the filter bed 30 with the filtered liquid being discharged to the discharge pipe 38 through the discharge collector screen 34. Screen 34 has openings slightly smaller than the smallest polyethylene particles. Thus, only the liquid can pass through the screen 34 while the polyethylene particles 32 are retained along with suspended solids. A valve 40 controls the output flow of filtered liquid.

After the solids holding capacity of the filter bed is at least partially loaded with solids filtered from the contaminated liquid 10, the flow of liquid through the filter is terminated by stopping pump 18 and closing valves 22 and 40. The backwashing or cleansing cycle is initiated to remove the accumulated solids from the filter bed. The solids and backwash liquor are collected in a storage tank or backwash water collection tank 42 where they can be easily settled out, some liquor decanted, and the balance dried.

Figure 3:
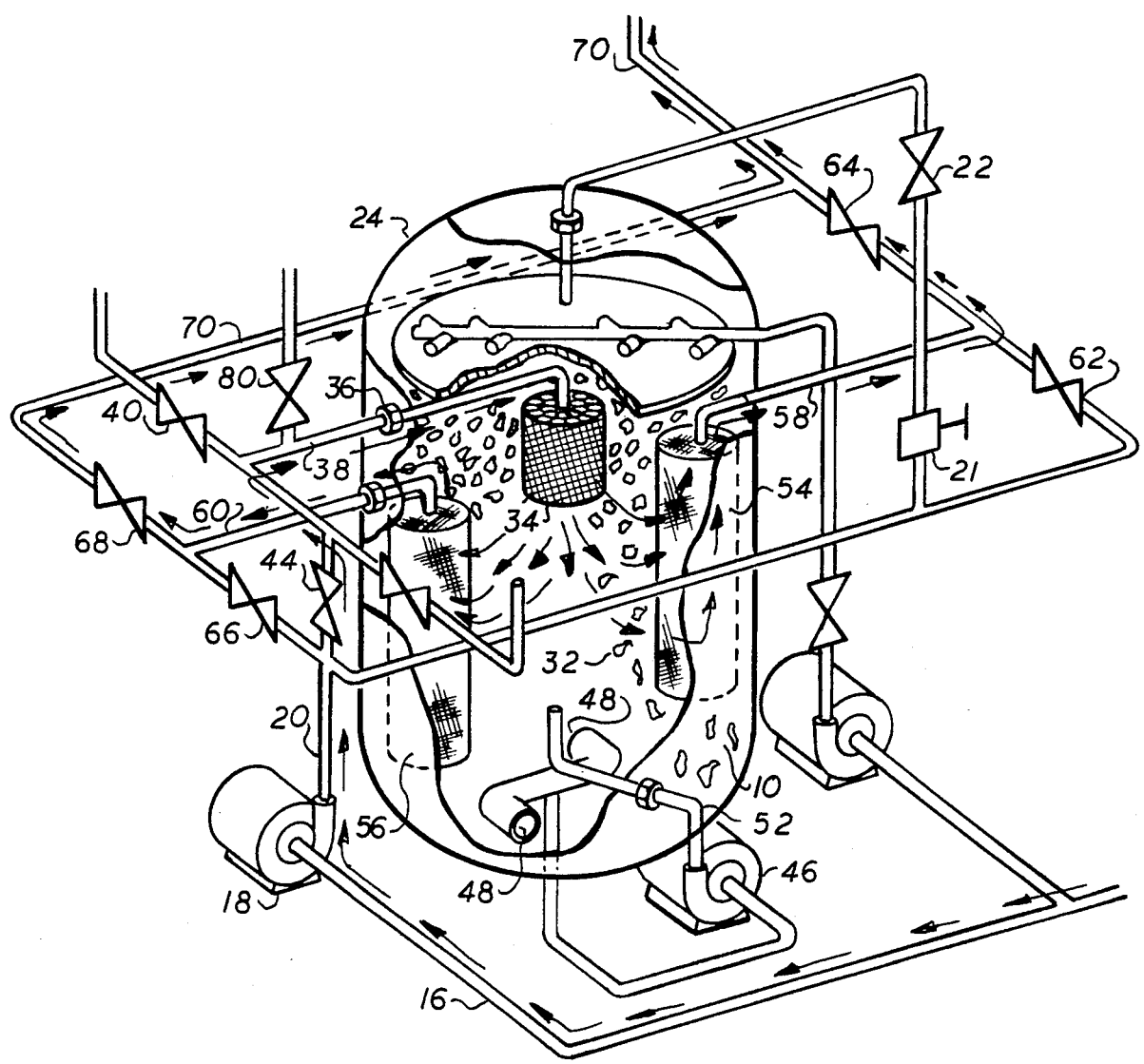
FIG. 3 is a schematic view of one embodiment of the filtering system during flow reversal of the incoming contaminated liquid.

Applicant's invention provides for numerous alternatives for backwashing and cleaning the filter bed 30. FIG. 3 illustrates one such backwash cycle. With the flow of liquid terminated through the filter bed, a certain amount of contaminated liquid will remain in the bottom of the vessel 24.

A valve 44 on line 20 is opened at the same time, or just after, valves 22 and 40 are closed. Thus the feedwater 10 that is pumped from pump 18 reverse flows through the filtered liquid outlet 36 and the discharge collector screen 34. The feedwater 10 is forced through the filter bed 30 which loosens and removes some of the particles that were entrapped in the polyethylene particles 32.

In order to increase the agitation and turbulence of the polyethylene particles 32, a centrifugal pump 46 draws liquid from the bottom of the vessel 24 through a pair of bottom pump inlets 48. This arrangement allows heavily laden particles which may be at the bottom of the vessel to be drawn into pump 46 thereby loosening bound solids from the polyethylene particles when they pass through the pump 46. The discharge from pump 46 pumps the liquid and particles 32 upward through a discharge pipe 52 into the center of the vessel 24. This further aids in increasing the agitation of the polyethylene particles 32.

The agitation results in the polyethylene particles 32 being thoroughly mixed in the liquid remaining in the vessel when the valves 22 and 40 were first closed to begin the backwash cycle. The agitation of the polyethylene particles 32 causes the trapped contaminants to be loosened and removed from the polyethylene particles 32. As these contaminants are released from the polyethylene particles, they once again are mixed with the contaminated water and can be thus removed from the system. This is accomplished by drawing the now highly contaminated liquid 10 from the vessel through a pair of backwash collector screens 54, 56. These screens are made of molded polypropylene or stainless steel and have slotted openings about 1 inch long and 0.008 inches wide which will only allow the liquid and contaminants to flow through the opening. The polyethylene particles are larger than the openings in the backwash collector screens 54 and 56 and thus will not be permitted to pass through the openings and out of the vessel. A pair of outlet lines 58, 60 are connected to each of the backwater collector screens 54, 56, respectively. The lines 58, 60 each have a T with each end of the T connected to a pair of valves 62, 64, and 66, 68. A backwash collector line 70 is connected to the output of each of the valves 64, 68.

During the first stage of the backwash cycle valves 62 and 66 are closed, and valves 64 and 68 are opened resulting in the highly contaminated fluid flowing through the lines 58, 60. The highly contaminated liquid 10 is carried away in the backwash collection line 70 and into the backwash collection tank 42. This highly contaminated backwash liquid can be allowed to settle in a sludge thickening tank 71 and then further processed by traditional means such as a filter press 73 (FIG. 1) for solids dewatering to remove the collected solids and return the clarified liquid to the feedwater collection tank 14. Thus, unfiltered water is used for backwashing and no additional clean or filtered liquid must be introduced into the system. This backwash cycle breaks up the semi-solidified contaminated filter bed into smaller pieces which can pass through centrifugal pump 46.

Figure 4:
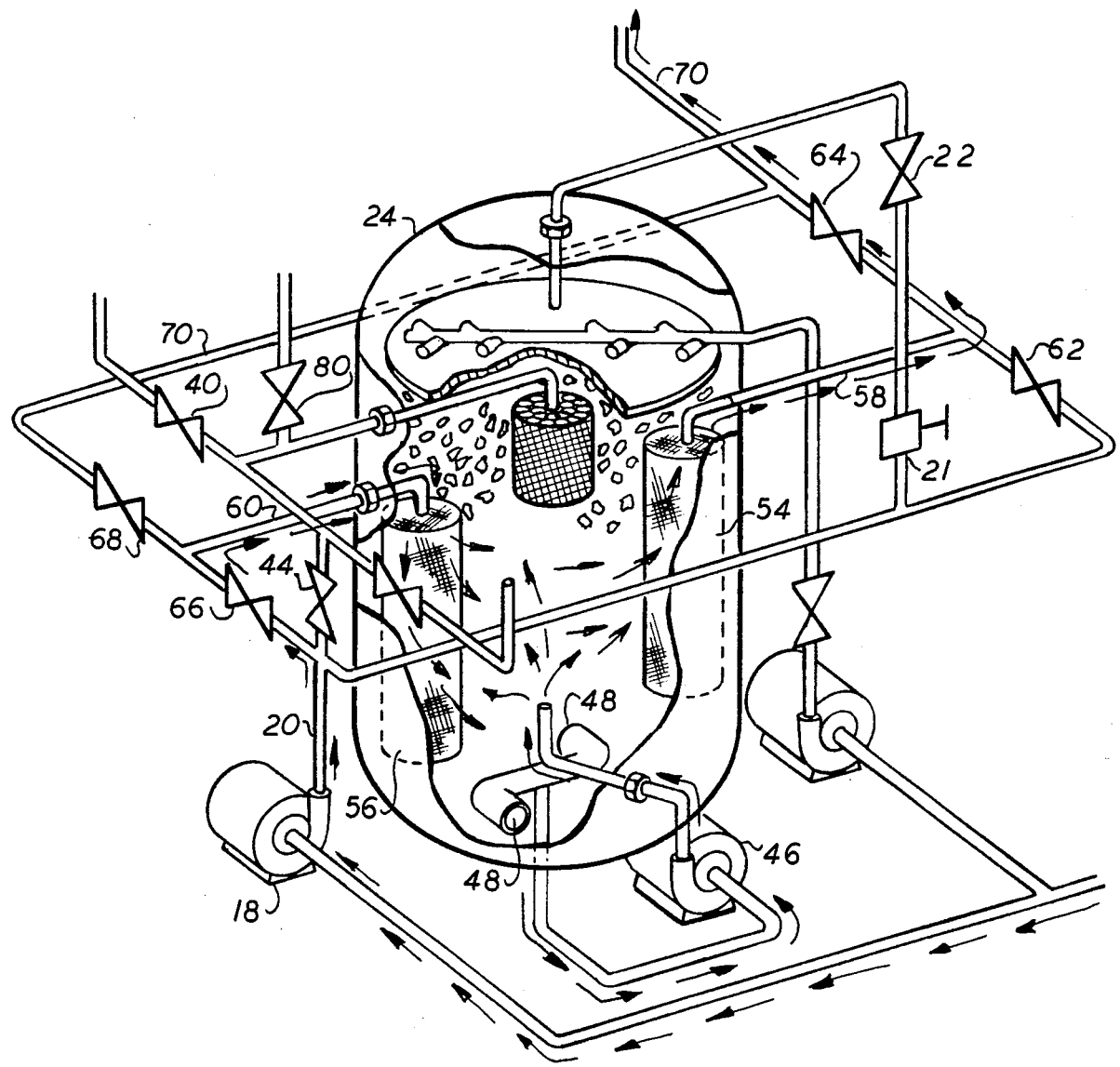
FIGS. 4 and 5 are schematic views of another embodiment of cross flow reversal of contaminated liquid through the filter bed to clean the polyethylene particles.
Figure 5:
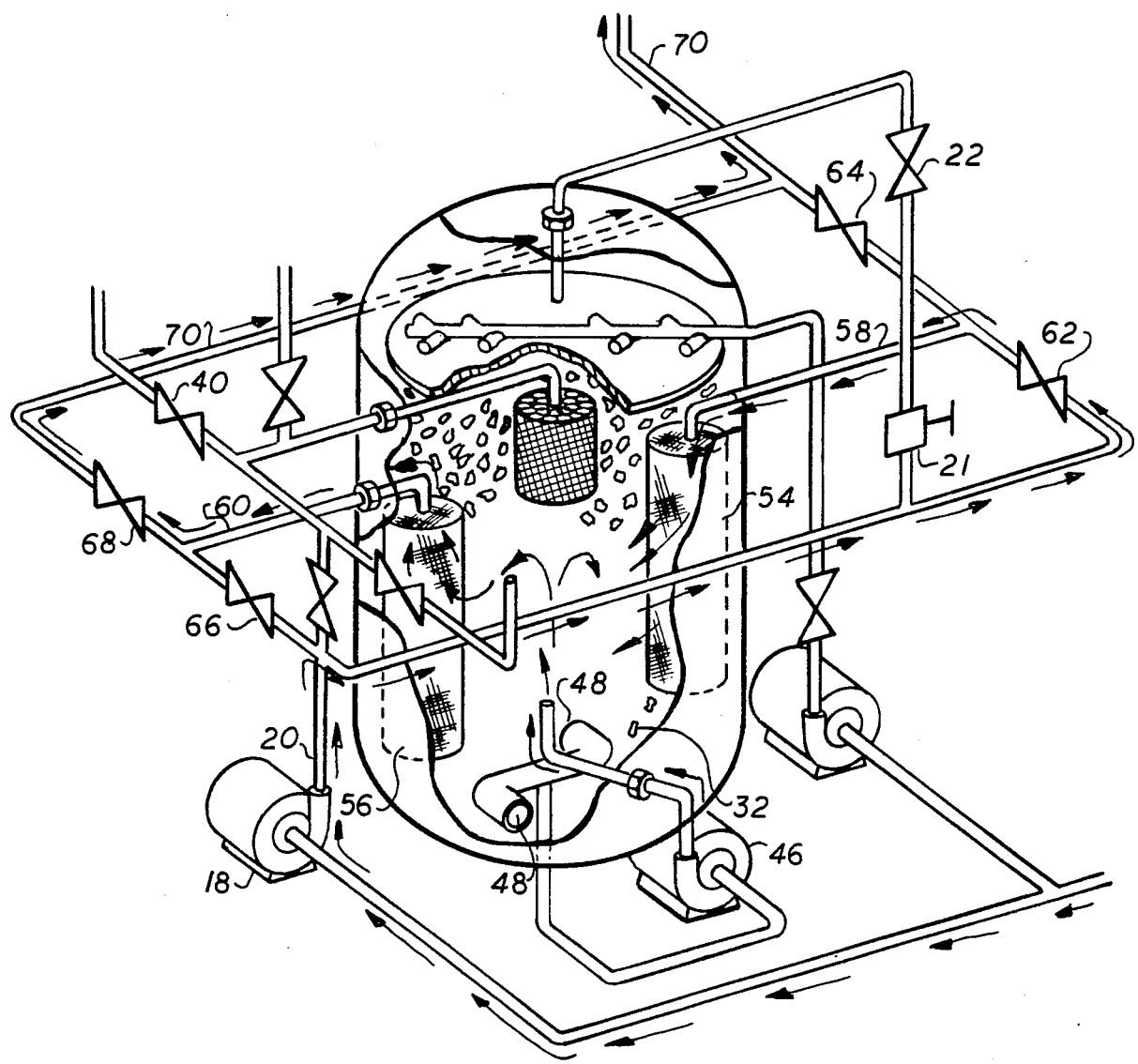

FIG. 4 shows an alternative flow pattern for cleaning the filter bed 30. With valve 66 opened, the contaminated liquid 10 flows from pump 18 through line 20. Valve 44 is closed to stop any flow up into the top of the vessel. The liquid is then forced through line 60 and out the backwash collector screen 56. Valve 62 is closed and valve 64 is opened to permit the highly contaminated liquid to flow out the backwash filter collector screen 54, through opened valve 64, and into the backwash collector line 70. This flow is permitted for approximately 6 seconds, depending on the size of the vessel 24, and then reversed by closing valves 64 and 66 and opening valves 62 and 68 (FIG. 5). This flow pattern alternates approximately every 6 seconds. During this alternating cross-flow, the pump 46 continues to further agitate the polyethylene particles within the vessel 24. This alternating flow pattern has been found to thoroughly agitate the entire filter bed and prevents reentrapment of the contaminants into the polyethylene particles 32 resulting in a highly efficient cleaning of the filter bed 30. It also makes an efficient use of the backwash water.

Figure 6:
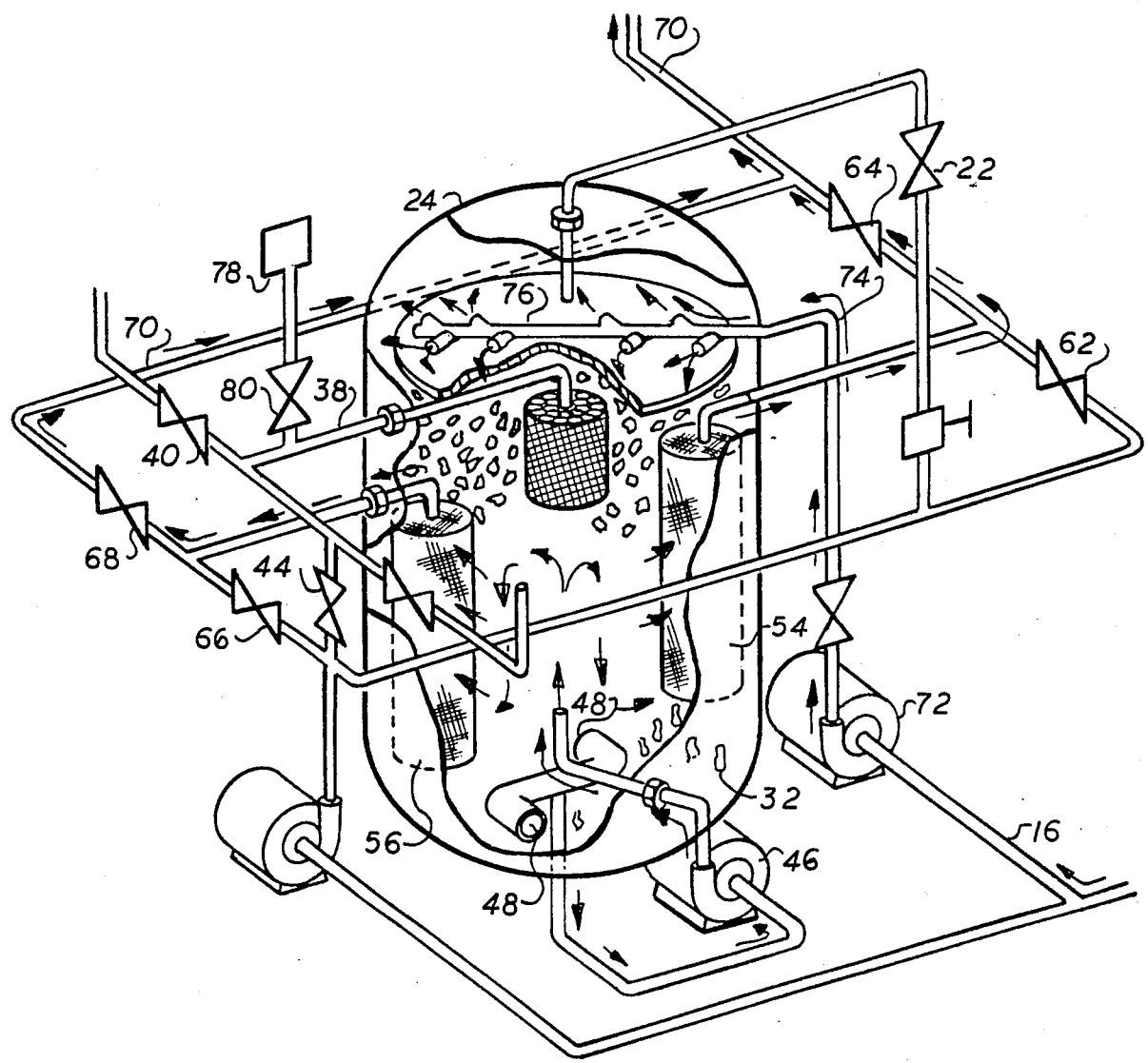
FIG. 6 is a schematic view of a third embodiment of the filtering system when the flow of the contaminated liquid enters from top and bottom inlets to agitate the filtering bed.

Another method to insure thoroughly agitating the filter bed to remove trapped contaminants is illustrated in FIG. 6. Here, the contaminated feedwater line 16 is connected to a third centrifugal pump 72. Pump 72 has its discharge connected to line 74 which goes up and into the top of the vessel 24. A series of nozzles 76 are connected to line 74 and are preferably positioned to discharge the contaminated liquid 10 in a high pressure stream that is discharged tangentially with respect to an arc drawn from the center of the vessel 24. All of the nozzles 76 should discharge the contaminated liquid 10 in the same direction to impart a swirling movement to the filter bed 30. This not only tends to break up the filter bed 30, but it also minimizes the possibility of a stream of contaminated liquid tunneling through the filter bed without causing the polyethylene particles 32 to be separated from each other. By swirling the filter bed 30, the sprays emitted from the nozzles 76 tend to move over the entire filter bed mass which greatly assists in separating the polyethylene particles and removing the contaminants trapped therein. This system can also be combined with the use of pump 46 creating an up-down flow of contaminated fluid.

It can also be seen in FIG. 6 that valves 64 and 68 are opened, while valves 62 and 66 are closed. This permits the highly contaminated liquid 10 to flow through the backwash collector screens 54, 56 and out to the backwash collector line 70. As previously stated, the highly contaminated liquid can be further processed to remove the solids while recycling the clarified liquid.

Another option available as illustrated in FIG. 6 is the introduction of air into the top of the vessel. This can be accomplished by means of a compressed air source 78 connected to a valve 80 which in turn is connected to the line 38. With all other valves connected to line 38 closed, and valve 80 opened, compressed air can be fed into the top of the chamber 24 through the filtered liquid outlet 36. The compressed air tends to lower the filter bed and actually pushes the polyethylene particles lower into the vessel. The purpose of this is to get the filter bed to initially move down into the vessel before it is thoroughly agitated by the other mixing processes previously described. Although this particular embodiment shows the air source 78 connected to the line 38, a separate line connected to the top of the vessel 24 can be utilized.

Figure 7:
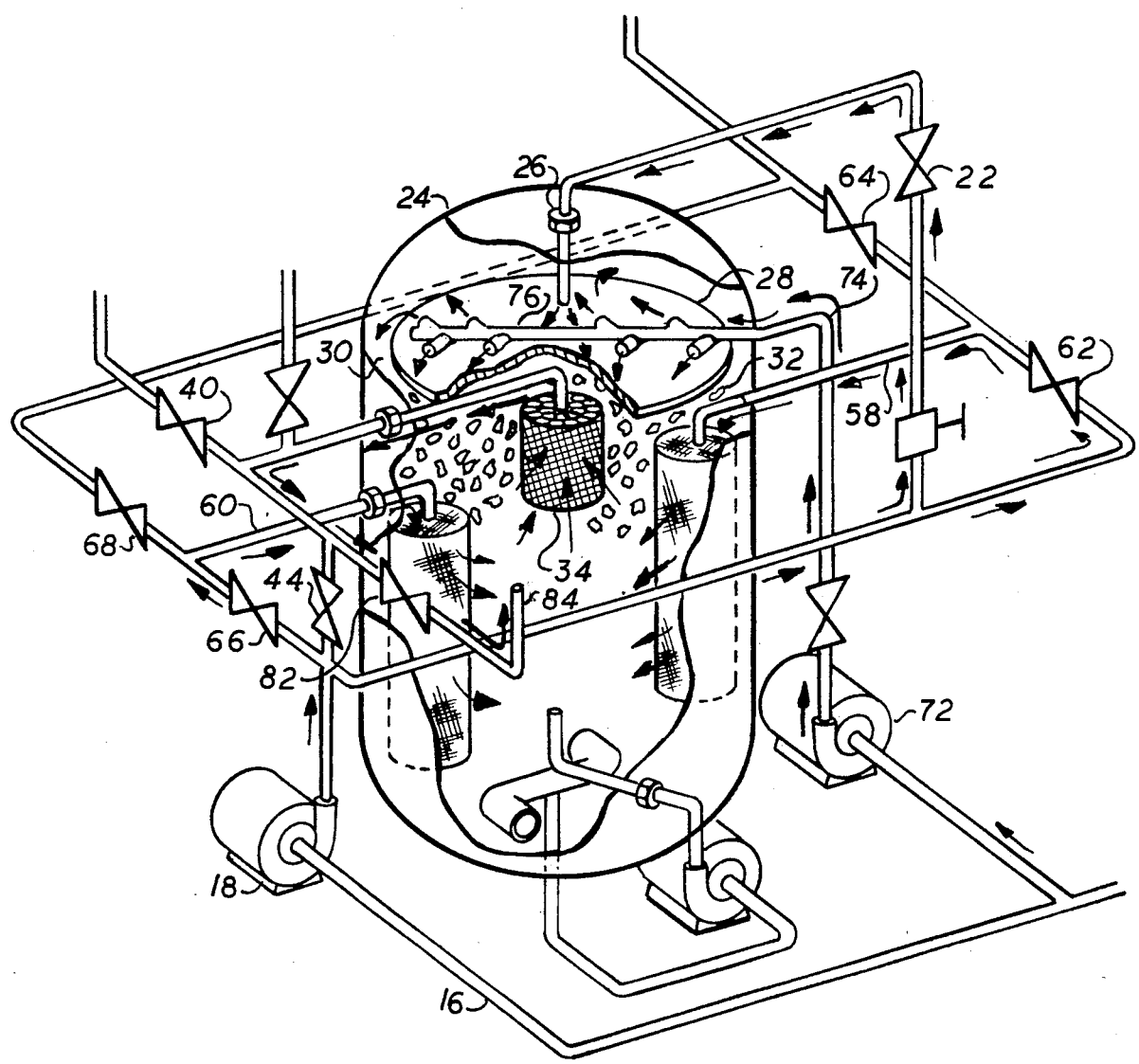
FIG. 7 is a schematic view of the filtering system illustrating how the flow of contaminated fluid resets a filter bed.

Before restarting the filtering process after a backwash cleaning cycle, it is recommended to reset the filter bed. One type of reset is illustrated in FIG. 7. This is necessary to reestablish the filter bed up at the top of the vessel such that the filter bed will freely float on top of the contaminated liquid remaining in the vessel 24. It must be remembered that the polyethylene particles 32 are not being contained within any type of filter bag or filter chamber and it is only due to the fact that the polyethylene particles 32 are lighter than the liquid that causes the particles to float. In one type of reset, pump 18 pumps contaminated liquid into the vessel through the backwash collector screens 54 and 56. This is accomplished by valves 44, 64, and 68 being closed and valves 62 and 66 being opened. Additionally, valve 22 is opened which allows contaminated water to flow at full flow of pump 18 in through the inlets 26 and down over the top of plate 28. In addition, pump 72 is turned on which pumps contaminated liquid up into the top of the vessel such that the contaminated liquid is discharged through the nozzle 76. Valve 40 is closed and a reset valve 82 is opened. Reset valve 82 is connected to a reset line 84 which feeds the contaminated discharge water back to the feedwater collection tank 14. Thus, until the filter bed is reset, contaminants may pass through this system and be carried by the contaminated water back to the feedwater collection tank. After the filter bed is reset and rinsed of any residual contaminants located close to screen 34, the system is once again ready to begin the filtering process.

In the preferred embodiment, the time during which the filtration process continues can be preset and programmed in a programmable controller. Similarly, the backwash cycle can be predetermined and also programmed into the controller. The pumps and valves can thus be automatically controlled from the output signals of the controller. The exact backwash cycle, as can readily be appreciated, can be modified depending upon the particles being filtered and the needs of the user. For instance, the user can vary the backwash time and the particular method of backwashing. In one situation it may be advantageous to alternate the flow of liquid between the backwash collector screens 54 and 56, and in another system it may be advantageous to only backwash in one direction. The inventive device is designed such that numerous options are available to the user.

For example, the introduction of air into the vessel 24 enhances the effectiveness of the spray from the nozzles 76. Another effective combination is the flow reversal through screens 54 and 56 with the mixing pump 46 turned on. At the same time, the liquid level is lowered by the introduction of air. The system can be momentarily stopped to allow the contaminants to settle into the lower portion of the vessel where they can be easily removed by the alternating backwash flow.

It is important that the filter bed is thoroughly agitated during the backwash cycle to cause the trapped contaminants to be released or scrubbed away from the polyethylene particles 32 and placed back into the liquid for removal. Through experience, it has been determined that the more thorough the agitation of the filter bed during backwashing, the better the results are at cleaning the filter bed. This type of system also provides for cleaning the entire filter bed rather than just portions of the filter bed.

It can also be seen that the agitation and cleaning of the filter bed is accomplished without any moving parts within the vessel 24. All of the agitation is done by means of water jets or fluid movement which minimizes the possiblity of internal mechanical breakdowns. Furthermore, this minimizes the possibility of breaking down the polyethylene particles into small sizes which in turn may be removed from the vessel during the filtering process which is undesirable as it results in the loss of filtering material. It also would result in polyethylene particles contaminating the filtered liquid.

The particular illustrated embodiment shows the feedwater entering the vessel 24 from the top. However, the system can be designed with the feedwater entering the bottom of the vessel, flowing upwards through the filter bed 30, with filtered liquid flowing out through discharge pipe 38. The backwash cycle remains the same as previously described.

In actual applications wherein the waste water from plating operations have produced metal hydroxides such as copper hydroxides, cadmium hydroxides, zinc hydroxides and nickel hydroxides, the filtration process has proved to be extremely efficient. Suspended metal hydroxides of 88.3 parts per million being introduced into the vessel were filtered and the filtered liquid had an output of 1.3 parts per million. Subsequent tests had contaminated liquid of 90 parts per million being introduced with 2 parts per million of contaminants being detected in the filtered output. The results were constant in removing contaminants of less than 1 micron in size from the filtered liquid output.

An advantage of this system is that the components, including the filtering polyethylene particles, can be manufactured from food grade components. These materials can be the subject of Federal Drug Administration approval.

Thus, there has been provided a filtration system and method for the removal of suspended solids from a contaminated liquid that fully satisfies the objects, aims and advantages set forth above. It is evident that many alternatives, modifications, and variations will be apparent to those skilled in the art. Accordingly, it is intended to embrace such variations as fall within the spirit and broad scope of the appended claims.

What is claimed is:

1. A filtration system for the removal of suspended solids from a contaminated liquid comprising:
   a cylindrical closed vessel having a top and a bottom;
   a filter bed of ground polyethylene particles freely floating within the vessel;
   first pump means for pumping the contaminated liquid to the vessel under pressure;
   first inlet means located at the top of the vessel and connected to the first pump means for introducing the contaminated liquid into the vessel; a circular plate located adjacent the first inlet means and having an opening between its outer edge and the vessel, whereby the contaminated liquid introduced into the vessel is caused to flow onto the circular plate, around the inside of the vessel wall and down into the filter bed;
   first outlet means positioned towards the top of the vessel for outlet of liquid after it passes through the filter bed and is filtered;
   screen means adjacent to the first outlet means to restrain the filter bed from entering the first outlet means;
   first valve means connected to the first outlet means to control the flow of the filtered liquid out of the vessel;
   means to thoroughly agitate the filter bed to loosen and remove the contaminants trapped by the polyethylene particles while the first valve means is closed thereby producing a concentrated contaminated liquid; and
   second outlet means to outlet the concentrated contaminated liquid.

2. The system of claim 1 wherein the means to agitate the filter bed comprises second valve means and pipes connected to the first outlet means to backwash contaminated liquid through the first outlet means by the introduction of contaminated liquid into the vessel through the first outlet means and the filter bed when the first valve means is closed.

3. The system of claim 1 wherein said second outlet means comprises means for permitting the passage of concentrated contaminated liquid out of the vessel while restraining and prohibiting the passage of the polyethylene particles out of the vessel.

4. The system of claim 3 wherein the second outlet means comprises a pair of screened outlets.

5. The system of claim 4 and further comprising third valve means to introduce contaminated liquid into the vessel through one of the screened outlets and fourth valve means to outlet the concentrated liquid through the other screened outlet.

6. The system of claim 5 and further comprising second pump means for pumping contaminated liquid to the screened outlets and valve means associated with each of the screened outlets to selectively control the flow of contaminated liquid into and out of the vessel through the screened outlets.

7. The system of claim 6 and further comprising control means associated with each of the valve means for alternately opening and closing the screened outlets to reverse the flow of contaminated liquid between the screened outlets.

8. The system of claim 1 and further comprising air inlet means at the top of the vessel to introduce air into the vessel to lower the filter bed before the filter bed is agitated.

9. The system of claim 1 wherein the means to agitate the filter bed comprises spray inlets at the top of the vessel to introduce contaminated fluid under pressure onto the top of the filter bed.

10. The system of claim 1 wherein the means to agitate the filter bed comprises sprayer means to simultaneously spray contaminated fluid onto the top of the filter bed and a bottom inlet connected to a pump to pump contaminated liquid into the center of the vessel.

11. The system of claim 1 and further comprising a backwash holding tank in fluid communication with the second outlet means to receive the concentrated contaminated liquid for further processing.

12. The system of claim 1 wherein the first outlet means is centrally disposed with respect to the vertical walls of the vessel.

13. A method for the removal of suspended solids from a contaminated liquid in a filtration system comprising the steps of:
(a) providing a cylindrical closed vessel having a top and a bottom with a filter bed of ground polyethylene particles;
(b) introducing under pressure the contaminated liquid into the top of the vessel and cascading it around the inside wall of the vessel;
(c) freely floating the filter bed of ground polyethylene particles in the vessel;
(d) flowing the contaminated liquid through the filter bed and depositing the contaminants onto the polyethylene particles resulting in a filtered liquid;
(e) discharging the filtered liquid from the vessel;
(f) periodically stopping the flow of contaminated liquid through the filter bed;
(g) thoroughly agitating the filter bed in the contaminated liquid while the introduction of contaminated liquid is stopped, loosening the contaminants from the polyethylene particles thereby producing a concentrated contaminated liquid; and
(h) discharging the concentrated contaminated liquid from the vessel to further processing means.

14. The method of claim 13 wherein the filtered liquid is discharged through a centrally disposed outlet at the top of the vessel.

15. The method of claim 13 and the further step of introducing air under pressure into the top of the vessel to lower the filter bed before it is agitated.

16. The method of claim 13 and the further step of introducing air under pressure into the top of the vessel to lower the filter bed during agitation.

17. The method of claim 13 wherein the filter bed is agitated by spray means discharging under pressure contaminated liquid onto the top of the filter bed.

18. The method of claim 17 wherein the contaminated liquid is sprayed onto the filter bed at an acute angle to cause the filter bed to swirl.

19. The method of claim 13 wherein the filter bed is agitated by means of spraying under pressure contaminated liquid into the vessel through one of a pair of screened outlets, and outletting the concentrated liquid through the other screened outlet.

20. The method of claim 19 and periodically alternating the introduction of contaminated liquid and outletting of concentrated liquid between the pair of screened outlets.

21. The method of claim 13 wherein the filter bed is agitated by means of vertically introducing contaminated fluid under pressure into the central portion of the vessel.

22. The method of claim 13 wherein the contaminated liquid is introduced into the bottom of the vessel, flowed through the filter bed and discharged through the top of the vessel.

23. A filtration system for the removal of suspended solids from a contaminated liquid comprising:
a cylindrical closed vessel having a top and a bottom;
a filter bed of ground polyethylene particles freely floating within the vessel;
a first pump means for pumping the contaminated liquid to the vessel under pressure;
a first inlet means connected to the first pump means for introducing the contaminated liquid into the vessel;
first outlet means positioned towards the top of the vessel for outlet of liquid after it passes through the filter bed and is filtered;
screen means adjacent to the first outlet means to restrain the filter bed from entering the first outlet means;
first valve means connected to the first outlet means to control the flow of the filtered liquid out of the vessel;
additional pump means connected to tangential inlet means within the vessel, and valve means associated therewith to selectively control the flow of contaminated fluid into the vessel through the tangential inlet means, the additional pump means thoroughly agitating the filter bed to loosen and remove the contaminants trapped by the polyethylene particles and being activated while the first valve means is closed thereby producing a concentrated contaminated liquid; and
second outlet means to outlet the concentrated contaminated liquid.

* * * * *